3,359,881
WINDSHIELD DEFROSTING UNIT FOR
AUTOMOBILE
Terrence R. Lamb, 1917 S. Randolph St.,
Arlington, Va. 22204
Filed Oct. 22, 1965, Ser. No. 500,650
3 Claims. (Cl. 98—2)

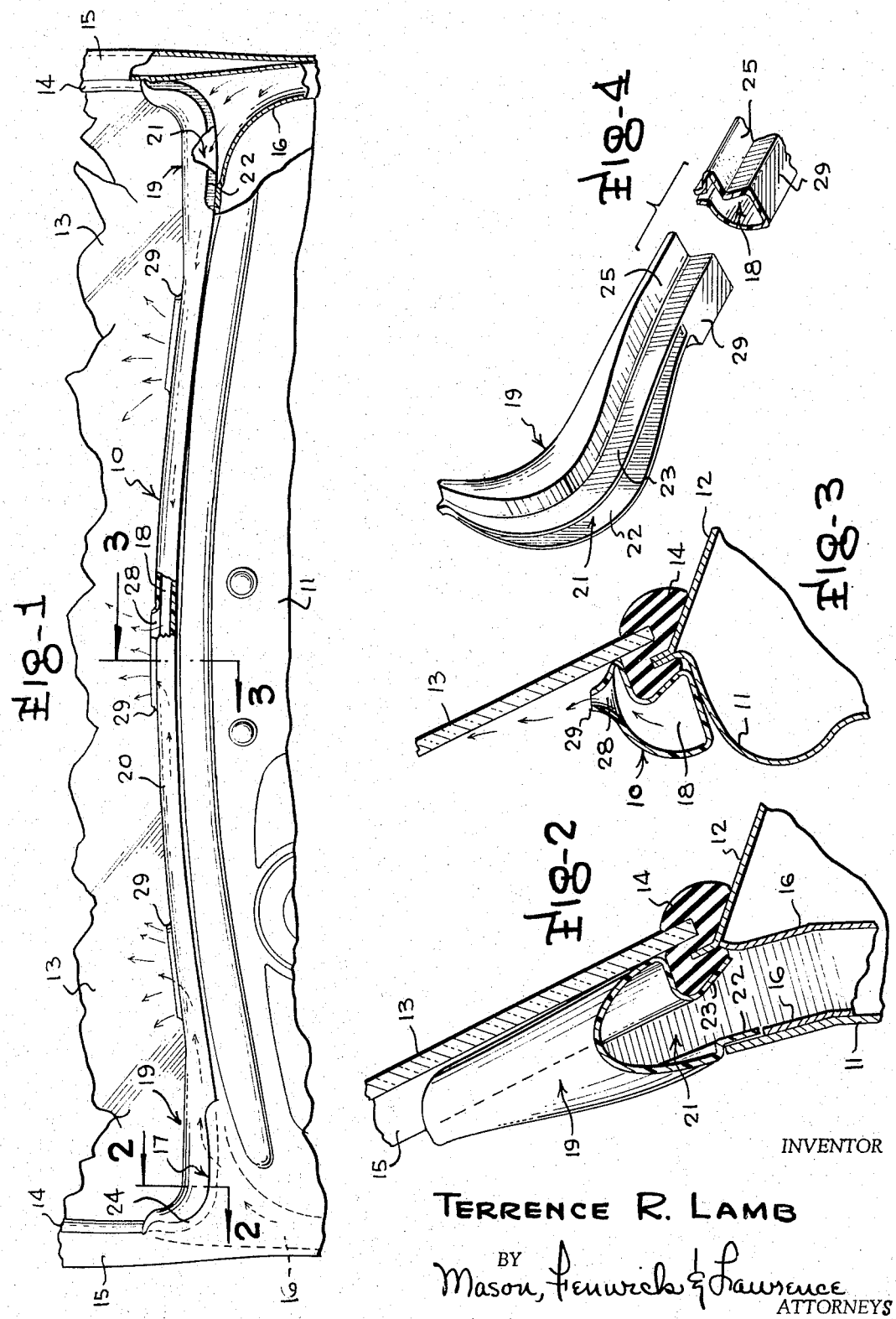

The present invention relates in general to automobile defrosters, and more particularly to a defroster unit which may be utilized in conjunction with automobiles having, as original equipment, a defrosting unit which does not supply air flow across the entire expanse of the windshield and especially to the portion of the windshield through which the driver and the passenger view the road.

Heretofore, certain automobiles, and especially those automobiles having a rear mounted air cooled engine, have had extremely deficient heating and defrosting units which did not properly defrost a windshield under adverse weather conditions. The deficiencies in part were due to the fact that the air flow to the defroster was not sufficient to effect efficient defrosting of the windshield. This is mainly due to the fact that the air flow to the defroster in these air cooled automobiles is directly dependent upon the engine speed since the engine drives the blower fan that supplies the air flow to the defroster. A more serious deficiency of these systems, however, is the fact that certain of the automobiles embodying these systems have the defroster air flow outlets placed only in the lower corners of the windshield. Such a placement of the air flow outlets obviously distributes the defroster air only to a very small area of the windshield. Being in the lower corner of the windshield, this small area affords no significant defrosting action at low engine speeds. It has been found that by taking the air flow from these poorly located outlets and distributing it along the length of the windshield that the resulting air flow, even at low engine speeds, was sufficient to effect adequate defrosting even under adverse weather conditions.

Therefore, an object of the present invention is the provision of a defrosting unit for automobile windshields which distributes the air flow in an economical and efficient manner.

Another object of the present invention is the provision of an automobile defrosting unit which is positioned along the lower edge of the windshield to carry the air flow from remote supply ducts to desired locations along the length of the windshield.

Another object of the present invention is the provision of a tubular automobile defroster unit designed to be snap-fitted without alteration into many stock models of automobiles to effect an efficient distribution of air flow from remote heater supply ducts.

Still another object of the present invention is the provision of an automobile defroster unit designed to effect efficient distribution of the defroster air flow and which may be easily installed upon a variety of automobiles and yet be unobstrusive when fitted about the lower portion of the windshield.

And yet, another object of the present invention is the provision of a defroster unit for automobiles which may be readily installed by an unskilled person and which lends itself to easy manufacture at low cost and is ruggedly constructed and efficient in operation.

Other objects, advantages and capabilities of the invention will become apparent from the following description, taken in conjunction with the accompanying drawings showing only a preferred embodiment of the invention.

In the drawings:
FIGURE 1 is a front elevation view of the defroster unit mounted in one particular type of automobile showing portions of both the defroster unit and the automobile broken away for clarity;
FIGURE 2 is a vertical section view taken along lines 2—2 of FIGURE 1;
FIGURE 3 is a vertical section view taken along lines 3—3 of FIGURE 1; and
FIGURE 4 is a partial perspective view of one end of the defroster unit showing the bottom and rear sides of the air intake portion and the distributing portions.

Referring to the drawings wherein like reference characters designate corresponding parts throughout the several figures, the automobile defroster unit of the present invention is designated by the numeral 10. The defroster unit is shown mounted in a particular type of automobile which is especially adaptable to the unit. The numeral 11 represents the dash of an automobile which is formed in a curved manner, as seen in FIGURE 3, and interconnects with the rearmost extension of the automobile hood 12. Near the interconnecting point of the hood is mounted the windshield 13 fitted into a suitable gasket 14 which affords suitable weather proofing qualities between the windshield and the automobile interior. In the particular instance of this automobile interior, the gasket 14 is formed about the interconnecting point between the dash and the automobile hood. The windshield 13 is framed along its sides by corner posts 15 and the automobile roof which is not shown.

At the juncture of the corner posts 15 with the dash 11, there is a heater supply duct 16 extending upwardly from the lower portion of the automobile and terminating, in the lower corners of the windshield at the juncture of the dash 11 and the corner posts 15, in a heater outlet distributor 17.

The defroster unit 10 has a housing 20 of generally elongated tubular shape having relatively thin side walls and an enlarged air flow distributing opening 18 formed therethrough. At each end of the defroster unit 10 there is an air flow scoop 19 which is so designed that it makes a friction fit within the heater outlet distributor 17. The air flow scoops 19 connect the air flow distributing opening 18 with the heater supply ducts 16 by means of a defroster inlet air aperture 21. The inlet air aperture 21 is formed by a pair of flanking inlet air aperture flanges 22, 23. These two flanges are designed to frictionally engage the heater outlet distributor flange 24 and the windshield gasket 14. When properly placed in position inlet flange 22 engages the distributor flange 24 and the inlet flange 23 frictionally engages the gasket 14. It is normally desired that the air flow scoops 19 be molded to a flowing shape which generally matches the curvature encountered at the lower corners of the windshield.

Between the air flow scoops 19 the defroster unit housing 20 becomes elongated in shape to conform with both the shape of the dash 11 and the gasket 14. As may be seen from FIGURES 2 and 3, the defroster unit 10 throughout its entire length has a gasket recess 25 which is so proportioned that it fits snugly about the windshield gasket. It is also desired that the defroster base 26 should also conform to the upper surface of the dash 11 to effect a juncture between the defroster unit and the dash to give a well-finished appearance to the entire assembly. Along the upper surface 27 of the defrosting unit 10, there is positioned at spaced intervals air flow discharge apertures 28 through which the air flow within the distributor opening 18 is allowed to be discharged upon the windshield. In order to discharge the air flow at desired locations of the windshield, each of the apertures 28 is provided with an upstanding deflector which is molded into peripheral rim of the apertures 28 in a unitary manner.

In operation of the present invention, the defroster unit 10 would be friction fitted along the lower portion of the windshield 13 by placing the inlet air aperture flanges 22, 23 within the heater outlet distributor 17 and snapping the scoops 19 into the proper fit. This then allows the air flow from the remote heater supply ducts 16 to be forced into the defroster inlet air aperture 21 so as to flow through the distributor opening 18 and thence through each of the air flow apertures 28 where it is then directed upon the windshield by means of the deflectors 29. While in the present disclosure there is shown three deflectors, for distributing the air to the windshield, it should be noted that a number more or less could obviously be utilized and also that the deflectors need not be elongated in shape but may be of any other suitable configuration. It should be apparent also that an automobile having remote heater supply ducts 16 located in positions other than that shown in the present drawings could be fitted with the defroster unit 10 having air scoops 19 modified ad located to effect ready fit in that particular automobile.

It has been found that the defroster unit 10 may be manufactured from any of the well known plastics now in common usage. The only requiremtnts are that the plastics be relatively flexible and able to withstand the heat to which it would be subjected.

This invention has shown the defroster unit which is easily manufactured at low cost and one which meets definite needs and is yet extremely efficient in operation.

While I have particularly shown and described one particular embodiment of the invention, it is distinctly understood that the invention is not limited thereto but that modifications may be made within the scope of the invention and such variations as are covered by the scope of the appended claims.

What is claimed is:

1. A detachable defroster unit for supplying air flow from remote supply ducts of the automobile directly to the lower portion of a windshield mounted in a resilient molding at its lower periphery and having an air supply duct at at least each lower outward corner of the windshield, said ducts defined in part by thin rigid outlet distributors spaced from and parallel to the windshield wherein the defroster unit comprises an elongated hollow housing including a top surface, a bottom surface, and a longitudinal channel, said defroster unit adapted to be disposed adjacent the lower portion of the automobile windshield wherein the longitudinal channel fits snugly around the resilient molding, means on said housing adapted to be frictionally held between the windshield and the outlet distributors, said housing containing a plurality of airflow scoops integral therein and communicating with the hollow interior thereof, said air flow scoops positioned adjacent to the remote supply ducts to effect transfer of the air flow from the supply ducts to the hollow interior of the housing and a plurality of air flow apertures positioned within the upper surface of the defroster housing.

2. The defroster unit of claim 1 wherein there are means mounted upon each air flow scoop to effect removable interconnection of each scoop with at least one supply duct.

3. The defroster unit of claim 1 wherein there are deflector means mounted in conjunction with each air flow aperture to direct the air flow from the defroster unit to desired areas of the automobile windshield, the deflector means comprising an upstanding nozzle member having a free end for directing the air flow and a fixed end interconnected to the housing top surface at the peripheral extent of the air flow apertures.

References Cited

UNITED STATES PATENTS

| | | | |
|---|---|---|---|
| 2,096,901 | 10/1937 | Knecht | 98—2 |
| 2,327,917 | 8/1943 | Marong | 98—2 |
| 2,779,067 | 1/1957 | Stanley | 98—2 |
| 3,152,367 | 10/1964 | Fairbanks | 98—2 |

FOREIGN PATENTS

| | | |
|---|---|---|
| 1,183,336 | 7/1959 | France. |
| 637,203 | 5/1950 | Great Britain. |

MEYER PERLIN, *Primary Examiner.*